(12) United States Patent
Noda et al.

(10) Patent No.: US 9,168,695 B2
(45) Date of Patent: *Oct. 27, 2015

(54) BIAXIALLY STRETCHED POLYAMIDE RESIN FILM AND PRODUCTION METHOD THEREOF

(75) Inventors: Atsuko Noda, Uji (JP); Kiwamu Yuki, Uji (JP); Nobuhiro Tanaka, Uji (JP); Chiemi Nishitani, Uji (JP); Hiroshi Sakakura, Uji (JP)

(73) Assignee: UNITIKA LTD., Hyogo (JP)

( * ) Notice: Subject to any disclaimer, the term of this patent is extended or adjusted under 35 U.S.C. 154(b) by 606 days.

This patent is subject to a terminal disclaimer.

(21) Appl. No.: 12/448,244

(22) PCT Filed: Dec. 17, 2007

(86) PCT No.: PCT/JP2007/001417
§ 371 (c)(1),
(2), (4) Date: Jun. 12, 2009

(87) PCT Pub. No.: WO2008/075461
PCT Pub. Date: Jun. 26, 2008

(65) Prior Publication Data
US 2010/0080985 A1  Apr. 1, 2010

(30) Foreign Application Priority Data

| Dec. 18, 2006 | (JP) | 2006-339285 |
| May 23, 2007 | (JP) | 2007-137010 |
| May 23, 2007 | (JP) | 2007-137011 |
| Jun. 15, 2007 | (JP) | 2007-158978 |
| Jun. 22, 2007 | (JP) | 2007-165105 |

(51) Int. Cl.
| B29C 55/12 | (2006.01) |
| B29C 55/14 | (2006.01) |
| B29C 55/16 | (2006.01) |
| B32B 7/12 | (2006.01) |
| B32B 27/08 | (2006.01) |
| B32B 27/34 | (2006.01) |
| C08J 5/18 | (2006.01) |
| C08J 7/04 | (2006.01) |
| B32B 27/16 | (2006.01) |
| B32B 27/18 | (2006.01) |

(Continued)

(52) U.S. Cl.
CPC .............. *B29C 55/12* (2013.01); *B29C 55/143* (2013.01); *B29C 55/16* (2013.01); *B32B 7/12* (2013.01); *B32B 27/08* (2013.01); *B32B 27/16* (2013.01); *B32B 27/18* (2013.01); *B32B 27/20* (2013.01); *B32B 27/306* (2013.01); *B32B 27/308* (2013.01); *B32B 27/32* (2013.01); *B32B 27/34* (2013.01); *C08J 5/18* (2013.01); *C08J 7/047* (2013.01); *B29K 2077/00* (2013.01); *B32B 2255/10* (2013.01); *B32B 2255/20* (2013.01); *B32B 2255/205* (2013.01); *B32B 2255/26* (2013.01); *B32B 2255/28* (2013.01); *B32B 2270/00* (2013.01); *B32B 2307/306* (2013.01); *B32B 2307/31* (2013.01); *B32B 2307/50* (2013.01); *B32B 2307/518* (2013.01); *B32B 2307/54* (2013.01); *B32B 2307/558* (2013.01); *B32B 2307/7242* (2013.01); *B32B 2439/46* (2013.01); *B32B 2439/70* (2013.01); *B32B 2439/80* (2013.01); *B32B 2553/00* (2013.01); *C08J 2377/02* (2013.01); *C08J 2427/08* (2013.01); *Y10T 428/265* (2015.01); *Y10T 428/28* (2015.01); *Y10T 428/31562* (2015.04); *Y10T 428/31757* (2015.04)

(58) Field of Classification Search
CPC ...... B29C 55/12; B29C 55/143; B29C 55/16; B29K 2077/00; B32B 2255/10; B32B 2255/20; B32B 2255/205; B32B 2255/26; B32B 2255/28; B32B 2270/00; B32B 2307/306; B32B 2307/31; B32B 2307/50; B32B 2307/518; B32B 2307/54; B32B 2307/558; B32B 2307/7242; B32B 2439/46; B32B 2439/70; B32B 2439/80; B32B 2553/00; B32B 27/08; B32B 27/16; B32B 27/18; B32B 27/20; B32B 27/306; B32B 27/308; B32B 27/32; B32B 27/34; B32B 7/12; C08J 2377/02; C08J 2377/08; C08J 5/18; C08J 7/047; Y10T 428/265; Y10T 428/28; Y10T 428/31562; Y10T 428/31757
See application file for complete search history.

(56) References Cited

U.S. PATENT DOCUMENTS

| 2,201,741 A * | 5/1940 | Scroggie et al. ............... 264/340 |
| 3,510,552 A * | 5/1970 | Mutsuo et al. ............. 264/235.8 |

(Continued)

FOREIGN PATENT DOCUMENTS

| EP | 0885920 | 12/1998 |
| GB | 1110623 | 4/1968 |

(Continued)

OTHER PUBLICATIONS

Office Action in Indian application No. 2289/KOLNP/2009 dated Feb. 20, 2014.

(Continued)

*Primary Examiner* — Callie Shosho
*Assistant Examiner* — John Freeman
(74) *Attorney, Agent, or Firm* — Fildes & Outland, P.C.

(57) ABSTRACT

Disclosed is a biaxially stretched polyamide resin film which is a biaxially stretched film having a layer of a polyamide resin with caproamide as a repeating unit thereof and has an amount of the caprolactam monomer extracted from the biaxially stretched polyamide resin film of 0.1% by mass or less, and also disclosed is a packaging material including the biaxially stretched polyamide resin film.

2 Claims, No Drawings

(51) Int. Cl.
*B32B 27/20* (2006.01)
*B32B 27/30* (2006.01)
*B32B 27/32* (2006.01)
*B29K 77/00* (2006.01)

(56) References Cited

U.S. PATENT DOCUMENTS

| | | | | |
|---|---|---|---|---|
| 4,336,357 | A * | 6/1982 | Bartoli et al. | 525/420 |
| 4,438,180 | A | 3/1984 | Lang et al. | |
| 4,820,553 | A * | 4/1989 | Sopchak et al. | 427/304 |
| 4,844,834 | A * | 7/1989 | Dellinger | 252/182.3 |
| 5,459,168 | A * | 10/1995 | Nasr et al. | 521/49.8 |
| 5,578,372 | A | 11/1996 | Murakami | |
| 6,169,161 | B1 | 1/2001 | Tachibana et al. | |
| 6,326,457 | B1 * | 12/2001 | Erbes et al. | 528/310 |
| 6,875,838 | B2 * | 4/2005 | Alsop et al. | 528/310 |
| 8,293,160 | B2 * | 10/2012 | Yuki et al. | 264/288.4 |
| 2003/0176625 | A1 * | 9/2003 | Morhenn et al. | 528/310 |
| 2003/0186032 | A1 * | 10/2003 | Rosenberger et al. | 428/195.1 |
| 2004/0049005 | A1 * | 3/2004 | Gahr et al. | 528/314 |
| 2006/0173156 | A1 * | 8/2006 | Van Geenen et al. | 528/310 |

FOREIGN PATENT DOCUMENTS

| | | |
|---|---|---|
| JP | 08-238728 | 9/1996 |
| JP | 09-193305 | 7/1997 |
| JP | 2001-081189 | 3/2001 |
| JP | 2004-10785 | 1/2004 |
| WO | 2007/069589 | 6/2007 |

OTHER PUBLICATIONS

Office Action in corresponding Japanese Patent Application No. 2008-550043.
English language abstract and machine translation of JP2004-10785.
Extended European Search Report in application No. 07849847.4 dated Jul. 25, 2014.

* cited by examiner

BIAXIALLY STRETCHED POLYAMIDE RESIN FILM AND PRODUCTION METHOD THEREOF

TECHNICAL FIELD

The present invention relates to a biaxially stretched polyamide resin film and a production method thereof, particularly, a biaxially stretched polyamide resin film which is rendered usable, for example, by laminating therewith a resin sheet made of a polyolefin such as polyethylene or polypropylene to serve as a sealant, for a package container body made of a polyamide resin, the package container body being particularly suitable for use in medical containers such as infusion bags and other containers, and a production method of the biaxially stretched polyamide resin film.

BACKGROUND ART

A biaxially stretched polyamide resin film using a polyamide such as nylon 6 and/or nylon 66 is excellent in the mechanical properties such as tensile strength, adhesive strength, pinhole strength and impact-resistant strength, and additionally, in gas-barrier property and heat resistance. Thus, laminated films, in which a biaxially stretched polyamide resin film is used as a front substrate and a sealant made of a polyolefin film is bonded to the front substrate by a method such as dry laminating or extrusion laminating, are used in wide fields including packaging materials for use in sterilization treatment such as boiling or retorting.

Such biaxially stretched polyamide resin films are usually used as front substrates, and are in many cases free from direct contact with contents. Accordingly, the behavior of the caprolactam monomer (hereinafter, abbreviated as "monomer" as the case may be) in the biaxially stretched polyamide resin films has not been much mentioned yet.

In these years, however, the issue of the deterioration of packaged articles and contents has undergone increasingly severe requests thereto, and the improvement of the issue has come to be demanded. In particular, in the medical applications or the like objecting to subtle compositional changes of the contents, the small molecular weight monomers contained in the polyamide resin film pass through the sealant to migrate into the contents, when heating, for example, for sterilization treatment is conducted, and hence it comes to be impossible to leave such an issue out of consideration.

For the purpose of coping with the issue, there have been proposed polyamide resins, in each of which the molecular weight of the constituent monomer unit is large, such as nylon 11 and nylon 12 or copolyamide resins mainly composed of nylon 11 and nylon 12 (JP 4-325159 A). Additionally, a copolymerized polyamide resin between 1,6-hexanediamine and sebacic acid has also been proposed (JP 2001-328681 A). However, these are specific polyamides, and are high in price and low in versatility. Consequently, strongly demanded are films in which highly versatile nylon 6 and/or nylon 66 is used and the amount of the monomer contained therein is low.

Even if the unreacted monomers and oligomers are removed from a polyamide resin at the stage of being chips prior to film molding, remelting of the polyamide resin chips with a melt extruder or the like regenerates monomers and oligomers, and consequently the monomers remain in the film to degrade the quality of the film. In particular, a polyamide in which caproamide is the main repeating unit thereof has a characteristic that the monomer tends to be more easily generated than in a polyamides formed of a dicarboxylic acid and a diamine.

In general, when the terminal group concentration of a polyamide resin is higher, the regeneration amount of the monomer at the time of remelting tends to be larger. Thus, there has been developed a polyamide in which the above-described problem is alleviated by adding a compound capable of reacting with the carboxyl terminals or the amino terminals of the polyamide. Specifically, there has been disclosed a method in which an organic glycidyl ester is reacted with the carboxyl groups and the amino groups of the polyamide (JP 10-219104 A). However, in this method, when the organic glycidyl ester and the polyamide chips are dry blended and melt-kneaded in an extruder, the organic glycidyl ester is allowed to react with the terminal groups of the polyamide. Therefore, in this method, it is difficult to perform uniform mixing in the dry blending step prior to film molding. Consequently, such non-uniform mixing offers a cause for the compositional variation. Thus, it is difficult to obtain a polyamide having a uniform terminal group concentration, and moreover, the dry blending step itself is unsuitable for films involving large melt extrusion amounts. Additionally, the amount of the monomer extracted after the melt molding remains to be as large as 0.35 to 0.5% by mass to show that the reduction amount of the monomer is insufficient.

On the other hand, there has been disclosed a method in which the terminal amino groups of a polyamide resin are blocked with a dicarboxylic acid anhydride (JP 2005-187665 A). However, the amount of the regenerated monomer at the time of melting remains to be as large as 0.27 to 0.75% by mass, revealing that it is difficult to sufficiently reduce the amount of the monomer extracted from the polyamide resin film.

On the other hand, in these years, recognized is a trend to regulate the discharge, from industrial plants and business institutions, of organic compound materials (generally abbreviated as "VOC") which evaporate at normal temperature and pressure and easily volatilize into the air. For example, in Japan, on the basis of the revised Air Pollution Control Law, a government ordinance that specifies the type and the size of the institution as an object of regulation came into effect on Jun. 1, 2005. Additionally, the government and ministry ordinances for the discharge standard value, the notification items, the measurement methods and the like were proclaimed on Jun. 10, 2005 and came into effect on Apr. 1, 2006.

Further studies are needed as to whether or not the caprolactam monomer discharged in the air provides adverse effects. However, in the production of a polyamide resin film, in printing on the film, and in the steps of laminate processing, bag forming processing and the like using the film, it is the manufacturer's responsibility to reduce the amount of the caprolactam monomer discharged into the air from the film.

Accordingly, the reduction of the amount of the caprolactam monomer extracted from the film and the recovery of the caprolactam monomer at the time of production of the film are strongly demanded.

DISCLOSURE OF THE INVENTION

Problems to be Solved by the Invention

The present invention solves the above-described problems, and takes as its object the provision of a biaxially stretched polyamide resin film which drastically reduces the amount of the caprolactam monomer eluted from the film without impairing the excellent intrinsic properties of the film, accordingly offers no possibility of deteriorating the packaged articles and the contents, and is usable for a package container body made of a polyamide resin, the package container body being suitable for use in medical containers such as infusion bags and other containers, and the provision of a production method of the biaxially stretched polyamide resin film.

Means for Solving the Problems

For the purpose of achieving the above-described object, the biaxially stretched polyamide resin film of the present invention is a biaxially stretched film using a polyamide resin, wherein the amount of the caprolactam monomer extracted from the film is 0.1% by mass or less.

The biaxially stretched polyamide resin film of the present invention is preferably a polyamide resin in which caproamide is the repeating unit thereof.

According to the biaxially stretched polyamide resin film of the present invention, the polyamide resin layer is preferably laminated with a vapor-deposition layer.

According to the biaxially stretched polyamide resin film of the present invention, the polyamide resin layer is preferably laminated with a gas-barrier coat layer. In this case, preferably, the gas-barrier coat layer is formed of a polyvinylidene chloride copolymer, the adhesion strength between the polyamide resin layer and the gas-barrier coat layer is 0.8 N/cm or more and the thickness of the gas-barrier coat layer is 0.5 to 3.5 μl.

According to the biaxially stretched polyamide resin film of the present invention, the polyamide resin layer is preferably laminated with a sealant resin layer.

According to the biaxially stretched polyamide resin film of the present invention, the polyamide resin layer is preferably laminated with an easy-adhesion layer formed of a urethane resin or a urethane-urea resin (also referred to as melamine-urea resin).

The production method of a biaxially stretched polyamide resin film of the present invention includes the implementation, at an optional stage in the production process of the biaxially stretched film using a polyamide resin, of a monomer removal step in which the film is brought into contact with water set at a pH of 6.5 to 9.0 and a temperature of 20 to 70° C. for 0.5 to 10 minutes.

According to the production method of a biaxially stretched polyamide resin film of the present invention, preferably an unstretched polyamide film is treated in the monomer removal step, thereafter the water content of the film is regulated to be 2 to 10% by mass in the water content regulation step, and then the film is simultaneously biaxially stretched.

The packaging material of the present invention includes the above-described biaxially stretched polyamide resin film.

Advantages of the Invention

According to the present invention, the application of the monomer removal step to the polyamide resin film enables to drastically reduce the amount of the monomer eluted from the film without impairing the excellent intrinsic properties of the polyamide resin film. Therefore, according to the present invention, there can be obtained a biaxially stretched polyamide resin film which offers no possibility of deteriorating the packaged articles and the contents, and is usable for a package container body made of a polyamide resin, the package container body being suitable for use in medical containers such as infusion bags and other containers.

BEST MODE FOR CARRYING OUT THE INVENTION

Hereinafter, the present invention is described in detail.

The biaxially stretched polyamide resin film of the present invention is required to have a polyamide resin layer, and additionally to have an amount of the monomer extracted from the film of 0.1% by mass or less. The amount of the extracted monomer is preferably 0.05% by mass or less and more preferably 0.02% by mass or less.

When the amount of the extracted monomer exceeds 0.1% by mass, even in the case where the polyamide resin film and a sealant are bonded to each other to form a laminated film and a package bag is formed of the laminated film so as for the polyamide resin film to be disposed on the side in noncontact with the contents, there is caused a problem that the monomer contained in the film passes through the sealant to migrate into the contents if the contents are watery.

The smaller the amount of the extracted monomer, the better. However, as the amount of the extracted monomer is made smaller, the monomer removal step at the time of film formation becomes longer to degrade the productivity. Therefore, the lower limit of the amount of the extracted monomer is about 0.001% by mass.

The amount of the monomer extracted from the polyamide resin film in the present invention is derived with the following measurement method on the assumption of a case close to the actual sterilization treatment of the packaging bags. Specifically, about 0.5 g of the film cut to a 0.5-cm square is precisely weighed and extracted by using 10 ml of distilled water in a boiling water bath (100° C.) for 2 hours; and for the thus obtained extraction liquid, the amount of the monomer extracted from the film is quantitatively determined by liquid chromatography (for example, by using HP1100 HPLC system manufactured by Hewlett Packard Corp.). The specific procedure for that purpose is described below.

Examples of the material for the biaxially stretched polyamide resin film in the present invention include nylon 6, nylon 66, nylon 46, nylon 69, nylon 610, nylon 612, nylon 11, nylon 12, polymetaxylylene adipamide (nylon MXD6), mixtures of these and copolymers of these. The biaxially stretched polyamide resin film of the present invention may be a two or more layer film formed of the above-described polyamide materials.

In particular, nylon 6, which is excellent in cost performance, is preferable from the viewpoints of the productivity and performance. When nylon 6 is used as a material for the film, the nylon 6 may include one or more polyamide components selected from the above-described polyamide species in an amount of 30% by mass or less in a copolymerized form, a mixed form, a form of a two or more layer film or other forms.

More preferably, for the purpose of suppressing the monomer generation at the time of melting, these polyamide resins include, as terminal blocking agents, an organic glycidyl ester, a dicarboxylic acid anhydride, a monocarboxylic acid such as benzoic acid, a diamine and the like.

The relative viscosity of the above-described polyamide resin is not particularly limited; however, the relative viscosity measured under the conditions that 96% sulfuric acid is used as a solvent, the measurement temperature is 25° C. and the concentration is 1 g/dl is preferably within the range from 1.5 to 5.0, more preferably from 2.5 to 4.5 and furthermore preferably from 3.0 to 4.0. When the relative viscosity of the polyamide resin is less than 1.5, the mechanical properties of the film tend to be remarkably degraded. When the relative viscosity of the polyamide resin exceeds 5.0, the film formability tends to be disturbed.

These polyamide resins may contain, where necessary as added thereto within an extent not adversely affecting the performances of the film, one or two or more various additives such as a pigment, an antioxidant, an ultraviolet absorber, a preservative agent, an antistatic agent, an antiblocking agent and an inorganic fine particle.

For the purpose of improving the slipping property of the film and other purposes, these polyamide resins may also contain, as mixed therewith, one or two or more of various inorganic or organic lubricants. Examples of such lubricants include clay, talc, calcium carbonate, zinc carbonate, wallastnite, silica, alumina, magnesium oxide, calcium silicate, sodium aluminate, calcium aluminate, magnesium aluminosilicate, glass balloon, carbon black, zinc oxide, antimony trioxide, zeolite, hydrotalcite, layered silicates and ethylene bis(steramide).

The polyamide resin film of the present invention is produced by the following method.

Roughly speaking, the polyamide resin film of the present invention is obtained, for example as follows: a polyamide resin composition is heated to be melted with an extruder, extruded from a T-die in a form of a film, and solidified by cooling on a rotating cooling drum by applying a heretofore known casting method such as air knife casting or electrostatic casting to form an unstretched film; and the unstretched film is subjected to a stretching treatment to yield the intended polyamide resin film. If the unstretched film is oriented, the unstretched film may undergo degraded stretchability in the subsequent steps, and hence the unstretched film is preferable in a state of being substantially amorphous or being substantially non-oriented.

The stretching treatment includes a successive biaxial stretching method in which longitudinal stretching is conducted and then a transverse stretching treatment is conducted, and a simultaneous biaxial stretching method in which a longitudinal stretching treatment and a transverse stretching treatment are conducted simultaneously. In the successive biaxial stretching method, longitudinal stretching may be conducted a plurality of times. In either of these stretching methods, the stretching treatment is conducted in such a way that the attained in-plane orientation coefficient is 0.05 or more and the attained area magnification is 9 or more.

The concerned stretching method is not particularly limited; however, because of being efficient, preferable is the simultaneous biaxial stretching method which enables in a single process to conduct a melt-film formation, a below-described monomer removal step, a water content regulation step, a stretching step, a heat setting step and a cooling step.

The film having been subjected to the successive biaxial stretching or the simultaneous biaxial stretching is heat-fixed at temperatures of 150 to 220° C. in the tenter where the stretching treatment has been conducted, and where necessary, subjected to a relaxation treatment in the longitudinal direction and/or the transverse direction within a range from 0 to 10% and preferably from 2 to 6%.

The production of the polyamide resin film of the present invention requires the monomer removal step to be set at an optional stage in the above-described film production process. Although the monomer removal step is claimed to be set at an optional stage, the monomer removal step is preferably conducted after melting the polyamide resin for molding into a film shape because the caprolactam in the polyamide resin undergoes the increase of the generated amount thereof caused by the melting of the polyamide resin. The monomer removal step may be conducted at any of a stage of the unstretched film, a stage after the longitudinal stretching and a stage after the biaxial stretching; however, the monomer removal step is preferably conducted at the stage of the unstretched film in which neither the crystallization nor the orientation of the film has not yet proceeded appreciably, because the efficiency of the monomer removal is satisfactory at such a stage and no monomer is discharged into the air during the stretching step.

The monomer removal step is conducted by bringing under tension the polyamide film into contact with water set at a pH of 6.5 to 9.0 and a temperature of 20 to 70° C. in a monomer removal bath for 0.5 to 10 minutes.

In the monomer removal step, the temperature of the water in the monomer removal bath is required to be 20 to 70° C., and is preferably 30 to 65° C. and more preferably 40 to 55° C. When the temperature of the water in the monomer removal bath is lower than 20° C., the monomer is hardly removed in a short time. When exceeding 70° C., in a case where the monomer removal step is conducted at the stage of the unstretched film, the unstretched film tends to undergo wrinkling, and hence the stretching becomes non-uniform to degrade the quality of the stretched film; and additionally, operability is degraded such that troubles, at the time of stretching, such as the film breaking and the failure in gripping the film ends tend to occur.

The pH of the water in the monomer removal bath is required to be 6.5 to 9.0, and is preferably 7.0 to 8.5 and more preferably 7.5 to 8.0. When the pH is less than 6.5, the oxidation degradation of the polyamide resin film is allowed to proceed. When the pH exceeds 9.0, alkaline water attaches to the film and such water tends to attach to the worker unfavorably from the safety viewpoint.

The time during which the polyamide resin film is in contact with water in the monomer removal step depends on the temperature and the pH of the water and is required to be with the range from 0.5 to 10 minutes, and is preferably within a range from 0.5 to 5 minutes and more preferably from 1 to 3 minutes. When the contact time is less than 0.5 minute, it is difficult to sufficiently remove the monomer, and when the contact time exceeds 10 minutes, unpreferably the step becomes too long and the water content of the film at the time of stretching increases.

The water temperature, the pH and the contact time of water with the film in the monomer removal step are intimately related to each other. For the purpose of removing the monomer, the higher the water temperature, the more effective; however, when the temperature is set to be high, the unstretched film tends to undergo wrinkling. When the temperature is set to be low, the monomer removal takes a long time to degrade the productivity. When the pH is set to be 6.5 to 9.0 so as to fall within a weakly alkaline region, a relatively short time treatment enables, even at a low temperature, to selectively remove the monomer concerned.

In the case where stretching is conducted after the monomer removal step, for the purpose of avoiding troubles at the time of stretching, the unstretched polyamide film is treated in the monomer removal step to remove the monomer, thereafter preferably in the water content regulation step the water content of the polyamide resin film is regulated to be 2 to 10% by mass, preferably, 4 to 8% by mass, and then the stretching is conducted. When the water content is lower than 2% by mass, the stretching stress is increased and accordingly tends to cause troubles such as film breaking. Conversely, when the water content is higher than 10% by mass, the thickness unevenness of the unstretched film becomes large, and the thickness unevenness of the obtained stretched film also becomes large. In the water content regulation step, when the water content of the film is low, the water content is usually regulated by making the film pass through a water content regulation bath set at a temperature of 40 to 90° C., more preferably 50 to 80° C. and regulating the passage time. In the water content regulation bath, purified water is usually used; however, where necessary, for example, a dye, a surfactant and a plasticizer may be contained in the treatment liquid. Alternatively, the water content may also be regulated by spraying water vapor.

On the other hand, when the water content of the film is higher than 10% by mass, the water content is decreased by bringing the film into contact with a roll having a water-absorbing layer or by other techniques.

According to the present invention, adoption of a structure in which the polyamide resin layer is laminated with a vapor-deposited layer enables to yield a biaxially stretched polyamide resin film having few processing defects and being excellent in gas-barrier property. For the vapor-deposited layer, compounds made of inorganic or organic materials are used. As the inorganic materials, metals such as aluminum and inorganic oxides of the elements such as aluminum, silicon, magnesium and titanium are used.

Examples of the method for forming such an inorganic material layer include a vacuum vapor-deposition method, a sputtering method, a chemical vapor-deposition (CVD) method and a physical vapor-deposition (PVD) method. In particular, the vacuum vapor-deposition method is excellent in practicability.

When the vapor-deposition processing is applied to the polyamide resin layer, for the purpose of enhancing the adhesion between the polyamide resin layer and the vapor-deposited layer, the polyamide resin layer may be preliminarily subjected to a treatment such as a corona treatment, a plasma treatment or a coating treatment with an inorganic or organic compound.

In the vacuum vapor-deposition, as the vapor-deposition material, aluminum (Al), alumina ($Al_2O_3$), silicon (Si), silica ($SiO_2$) or a combination of these is used. Examples of the method for heating the material include an electric resistance heating method, a high frequency induction heating method, an electron beam heating method and a laser heating method. Additionally, at the time of heating, a gas such as oxygen gas may be made to be concomitantly present, ozone may be added, or an ion assist method may also be adopted.

The thickness of the vapor-deposited layer is preferably about 1 to 1000 nm. When the thickness is 1 nm or less, no gas-barrier property is developed, and when 1000 nm or more, the flexibility of the processed film as a whole is lost to degrade the practicability.

According to the present invention, there may also be adopted a structure in which a gas-barrier coat layer is laminated at least on one side of the polyamide resin layer. For the gas-barrier coat layer, polyvinylidene chloride copolymer (PVDC) is preferable. However, the material for the gas-barrier coat layer is not particularly limited.

PVDC is a polymer including 60% by mass or more, preferably, 70 to 97% by mass of the vinylidene chloride unit, and is used in a form of a latex and coated at least on one side of the polyamide resin layer. The average particle size of PVDC in the latex is preferably 0.05 to 0.5 μm and particularly preferably 0.07 to 0.3 μm. In PVDC, within a range not impairing the advantages of the present invention, various additives such as an antiblocking agent, a crosslinking agent, a water repellant and an antistatic agent may also be concomitantly used.

The thickness of the gas-barrier coat layer using PVDC is within a range preferably from 0.5 μm to 3.5 μm, more preferably from 0.7 μm to 3.0 μm and furthermore preferably from 1.0 μm to 2.5 μm. When the coat layer is thinner than 0.5 μm, a sufficient gas-barrier property is hardly developed. On the other hand, when the coat layer is thicker than 3.5 μm, the effect of the coat layer is saturated and additionally the physical properties of the film may be impaired.

The adhesion strength between the polyamide resin layer, which is the substrate film, and the gas-barrier coat layer is preferably 0.8 N/cm or more, more preferably 1.0 N/cm or more and furthermore preferably 2.0 N/cm or more. When the adhesion strength is lower than the thus specified value, the polyamide resin layer and the gas-barrier coat layer may be delaminated from each other at the time of a boiling treatment or a retorting treatment, or no sufficient sealing strength may be attained.

When the gas-barrier coat layer is formed, it is important to form the gas-barrier coat layer in a stage where the amount of the monomer is small, after the monomer removal step and before the stretching, for the purpose of improving the adhesion to the substrate film.

The method for coating the gas-barrier coat layer is not particularly limited; there may be adopted methods such as a gravure roll coating method, a reverse roll coating method, an air knife coating method, a reverse gravure coating method, a Mayer bar coating method and an inverse roll coating method, and various coating methods as combinations of these methods, and various spraying methods.

The polyamide resin layer may be subjected to a corona discharge treatment or the like immediately before the coating.

The biaxially stretched polyamide resin film, thus obtained and having a structure in which a gas-barrier layer is laminated, has an excellent strength and mechanical properties as a polyamide film, and additionally has an excellent gas-barrier property and is excellent in the adhesion between the polyamide resin layer and the coat layer; consequently, the biaxially stretched polyamide resin film, thus obtained, is suitably usable as a packaging material.

According to the present invention, a structure in which the polyamide resin layer is laminated with a sealant resin layer may also be adopted. The lamination of the sealant resin layer on the polyamide resin layer enables to impart heat seal property, and the polyamide resin layer laminated with the sealant resin layer is usable as a packaging body.

For the sealant layer, a resin having a satisfactory thermal adhesiveness may be used. Examples of such a usable resin include low-density polyethylene, medium-density polyethylene, high-density polyethylene, linear polyethylene, polypropylene, ethylene-vinyl acetate copolymer, ionomer resin, ethylene-acrylic acid/methacrylic acid copolymer, ethylene-acrylic acid/methacrylic acid ester copolymer, acid-modified polyethylene/polypropylene resins and polyvinyl acetate resins. These may be used each alone, may be used as copolymerized or melt-mixed with other resins or components, or may be used as modified or otherwise. These resin components may be used each as a single layer or as multiple layers of at least one or more of these resin components. Particularly preferable among these are polyolefin resins such as polyethylene, polypropylene, polyethylene/polypropylene copolymer.

The polyamide resin layer is disposed as the outermost layer, the sealant layer is disposed as the innermost layer, and between the polyamide resin layer and the sealant layer, an aluminum foil layer, a gas-barrier resin layer, another thermoplastic resin layer, another polyamide resin layer and the like may be laminated in such way that the advantageous effects of the present invention are not impaired. The lamination method is not particularly limited; however, examples of the lamination method include a dry lamination method, a wet lamination method, a solventless dry lamination method and an extrusion lamination method.

The film including a sealant layer laminated therein is heat sealed on the sealant layer side and thus is preferably used as a bag-shaped body and a packaging body such as a covering material for tray packaging. Examples of the bag form include forms such as a three-side sealed bag, a four-side sealed bag, a pillow bag, a standing pouch and a rocket package.

Examples of the sealant layer formation method include a method in which the sealant layer is formed as a film and the film is laminated on the polyamide resin layer, a coextrusion method in which the polyamide resin layer and the sealant layer are extruded simultaneously to be laminated with each other, and a method in which the polyamide resin layer is coated with a resin for forming the sealant layer by using a coater. When the sealant layer is once made to take a form of film, the film may be either an unstretched film or a film stretched at a low stretching magnification; however, practically the film is preferably an unstretched film. Examples of the usable film formation method include a tenter method in which heating and melting are conducted in an extruder, extrusion is conducted from a T-die, and cooling for solidification is conducted with a cooling roll or the like, and a tubular method in which extrusion is conducted with a round die and cooling for solidification is conducted by water cooling or air cooling.

As the method for laminating the sealant layer formed in a form of film on the polyamide resin layer, a common production method may be applied. Examples of the applicable method include lamination methods such as a dry lamination method, a wet lamination method, a solventless dry lamination method and an extrusion lamination method. In particular, it is preferable to apply the extrusion lamination method.

Alternatively, a lamination method using an adhesive such as polyurethane may also be used. In this case, preferable is a method in which both the polyamide resin layer and the sealant layer are subjected to a corona discharge treatment or an easy-adhesion treatment, and thereafter the thus treated surfaces of these layers are laminated with each other through the intermediary of an adhesive.

As for the film obtained by laminating the polyamide resin layer and the sealant layer with each other, the use of the obtained film as a packaging body enables to reduce the deposition of the monomer from the polyamide resin layer onto the film surface at the time of applying a sterilization treatment based on dry or wet heat treatment to the packaging body. Accordingly, such a film is particularly suitable as a packaging body, such as a food package, to be subjected to a sterilization treatment such as a boiling treatment or a retorting treatment.

According to the present invention, an easy-adhesion layer formed of a urethane resin or a urethane-urea resin may also be disposed at least on one side of the polyamide resin layer.

The urethane resin for that purpose is a reaction product between a polyhydroxy compound and a polyisocyanate.

Examples of the polyhydroxy compound used as the material for polyurethane may include polyethylene glycol, polypropylene glycol, polyethylene-propylene glycol, polytetramethylene glycol, hexamethylene glycol, tetramethylene glycol, 1,5-pentanediol, diethylene glycol, triethylene glycol, polycaprolactone, polyhexamethylene adipate, polyhexamethylene sebacate, polytetramethylene adipate, polytetramethylene sebacate, trimethylolpropane, trimethylolethane, pentaerythritol and glycerin.

Examples of the polyisocyanate compound may include hexamethylene diisocyanate, diphenylmethane diisocyanate, tolylene diisocyanate, isophorone diisocyanate, an adduct between tolylene diisocyanate and trimethylolpropane, and an adduct between hexamethylene diisocyanate and trimethylolethane.

The urethane resin is not particularly limited; however, waterborne urethane resin may be preferably used from the viewpoint of the problem of the residual solvent in the film and the viewpoint of low environmental pollution. Examples of the waterborne urethane resin may include an ionomer-type self-emulsifying polyurethane resin, and additionally may include water dispersed urethane resins in which the terminal carboxyl groups are neutralized with cations of an amine, ammonia, sodium and the like, or neutralized with anions of a carboxylic acid and a halogen or with others.

The urethane-urea resin (melamine-urea resin) is a compound obtained by appropriately reacting, with each other, a polyhydroxy compound, a polyisocyanate, and a polyamine or an amino alcohol so as for the compound to contain urea groups.

Examples of the polyhydroxy compound and the polyisocyanate compound used for the polyurethane-urea resin may include the same compounds as the above-described compounds used for the urethane resin.

Examples of the polyamine include: low molecular weight diamines such as ethylenediamine, propylenediamine, hexamethylenediamine, hydrazine, 1,2-diaminoethane, 1,2-diaminopropane, 1,3-diaminopentane, 1,6-diaminohexane, diaminotoluene, bis-(4-aminophenyl)methane, bis(4-amino-3-chlorophenyl)methane, di-(aminomethyl)benzene, di-(2-amino-2-propyl)benzene, 1-amino-3-aminomethyl-3,5,5-trimethylcyclohexane, bis-(4-aminocyclohexyl)methane, diaminocyclohexane and di-(aminomethyl)cyclohexane; and low molecular weight amines having three or more amino groups such as diethylenetriamine, triethylenetetramine, tetraethylenepentamine, pentaethylenehexamine and 2,2'-diaminodiethylamine.

Examples of the amino alcohol include compounds having at least one amino group and at least one hydroxyl group such as 2-hydroxyethylhydrazine, N-(2-hydroxyethyl)-1,2-diaminoethane, hydroxyethyl diethylenetriamine and 3-aminopropanediol. The melamine-urea resin is also not particularly limited in the form thereof similarly to the urethane resin; however, waterborne urethane-urea resin may be preferably used from the viewpoint of the problem of the residual solvent in the film and the viewpoint of low environmental pollution.

For the purpose of enhancing the adhesion to the polyamide resin layer and the solvent resistance, it is desirable to concomitantly use a curing agent for the urethane resin or the urethane-urea resin. Examples of the curing agent include isocyanate compounds, melamine compounds, epoxy compounds, oxazoline compounds, carbodiimide compounds and aziridine compounds. These compounds may be mixed each alone or in combinations of two or more thereof in such a way that the pot life and the performances are not disturbed. The melamine compounds may be preferably used from the viewpoints of the curability and the pot life. In particular, methylolated melamines may be preferably used, and for the purpose of controlling the reactivity and imparting the storage stability, it is preferable to use methylolated melamines in which the methylol group is alkoxyated.

The step and operational sequence of providing an easy-adhesion layer are not particularly specified. Examples of the method concerned include: an in-line coating method in which an easy-adhesion coating treatment is conducted on an unstretched polyamide resin sheet with orientation uncompleted in the course of the film formation step, and thereafter stretching and heat fixing are conducted; and an off-line coating method in which coating is conducted on a stretched and heat-fixed polyamide resin layer. In particular, the in-line coating method is preferable from the viewpoints of the productivity and product quality.

The coating method involved is not particularly limited, and the same methods as the above-described methods for forming the barrier coat may be used.

The biaxially stretched polyamide resin film of the present invention, for the purpose of acquiring functionality, may be subjected to, for example, an antistatic treatment for suppressing the generation of static electricity, or may be coated with various functional coat liquids other than the above-described barrier coat liquid.

The thickness of the biaxially stretched polyamide resin film of the present invention is not particularly limited; however, the thickness concerned is preferably within a range from 10 μm to 30 μm when the film concerned is used for packaging purpose.

The biaxially stretched polyamide resin film thus obtained may be subjected, where necessary, to physicochemical treatments such as a corona discharge treatment, a plating treatment, a cleaning treatment and a dyeing treatment.

EXAMPLES

Next, the present invention is described specifically with reference to Examples. It is to be noted that the evaluation methods of the various physical properties in following Examples and Comparative Examples are as follows.

(1) Extracted Amounts of the Caprolactam Monomer and Cyclic Dimer in the Film

[Preparation of Measurement Sample]

First, 0.5 g of the film cut to a 0.5-cm square was precisely weighed and placed in a 10-ml headspace vial; 10 ml of distilled water was added into the vial and the vial was hermetically sealed with a butyl rubber stopper and an aluminum cap; thereafter, extraction was conducted for 2 hours in a boiling water bath (100° C.); then, after cooling of the vial, filtration was conducted with a 0.45-μm disc filter to prepare a measurement sample.

[Calibration Curves]

First, 0.1 g of caprolactam was dissolved in 100 ml of distilled water, and then the solution thus obtained was further diluted to prepare a 100-ppm standard solution. For the dimer which is lower in solubility, 0.01 g of the dimer was dissolved in 100 ml of distilled water to prepare a standard solution. Each of these standard solutions was injected in amounts of 1 to 10 μl to obtain calibration curves.

[HPLC Conditions]

Apparatus: HP 1100 HPLC system manufactured by Hewlett Packard Corp.

Columns: Waters Puresil 5μ C18 200 angstroms; 4.6 mm×250 mm (40° C.)

Detector: UV 210 nm

Elution: Elution was conducted for 12 minutes with an eluent of methanol/water (volume ratio)=35/75; then, the eluent was changed over to an eluent of methanol/water (volume ratio)=100/0 and elution was conducted for 30 minutes; and then, the eluent was changed over to the eluent of methanol/water (volume ratio)=35/75 over a period of 5 minutes and elution was conducted for 20 minutes.

Flow rate: 0.7 ml/min

Injection volume: 10 but 50 μl for low concentration samples

Detection limit: 3 ppm

[Calculation Method]

From the monomer concentration and the cyclic dimer concentration of a sample, detected under the above-described conditions, the mass of the monomer and the mass of the cyclic dimer in the sample were derived and divided by the mass of the film; the values thus obtained were defined as the extracted amounts (% by mass) of the monomer and the dimer.

(2) Water Content

An unstretched film having been subjected to a water absorption treatment was sampled and placed in a weighing bottle and then dried; thus, the water content was derived from the mass variation between before and after drying.

(3) Thickness Unevenness

By using a β-ray transmission thickness gauge, the thickness was measured across the width every 10 cm along the widthwise direction of a stretched film, and the value represented by the following formula was defined as the thickness unevenness; and the thickness unevenness was evaluated from the value thus obtained on the basis of the following three grades, "G (good), A (average), P (poor)," wherein the values of 15% or less, namely, the grades of "G" and "A," were determined as passing.

$$\text{Thickness unevenness} = (\text{Maximum thickness along the widthwise direction} - \text{minimum thickness along the widthwise direction})/\text{average thickness} \times 100$$

10% or less: G (good)

Exceeding 10% and 15% or less: A (average)

Exceeding 15%: P (poor)

(4) Operability

By visually observing the condition of an unstretched film passing though a warm water bath, the occurrence conditions of wrinkles, meandering and the like were evaluated. The case where wrinkles, meandering and the like did not occur was evaluated as satisfactory to be marked with "G." The case where wrinkles, meandering and the like occurred was evaluated as poor to be marked with "P."

(5) Relative Viscosity

The pellets of the polyamide resin were dissolved in 96% sulfuric acid so as for the concentration to be 1 g/dl, and the viscosity of the solution thus obtained was measured under the temperature condition of 25° C.

(6) Terminal Amino Groups

The resin to be measured was dissolved in a solvent (phenol/ethanol=4/1 in volume ratio), a predetermined amount of 0.02 N hydrochloric acid was added to the solution thus obtained, and back titration was conducted with a 0.02 N sodium hydroxide solution.

(7) Terminal Carboxyl Groups

The resin to be measured was dissolved in benzyl alcohol set at 180° C., phenolphthalein indicator was added to the solution thus obtained, and the solution was titrated with a 0.02 N ethanol solution of potassium hydroxide.

(8) Migration Test

The one side of the biaxially stretched polyamide resin film was subjected to a corona discharge treatment, the corona discharge-treated side was coated with a urethane adhesive (Takerack A-525/Takenate A-52, two-part type, manufactured by Mitsui Chemicals Polyurethanes, Inc.), the coated film was dried with a hot air dryer set at 80° C. for 10 seconds, and thus the adhesive coating amount was set to be 3 g/m². The adhesive-coated side and the corona-treated side of a sealant film (CPP, manufactured by Tohcello Co., Ltd., unstretched polypropylene film, RXC-21, thickness: 40 μm) were bonded to each other with a nip roll (nip condition: 80° C.) and wound up, and the bonded film was subjected to an aging for 72 hours in, an atmosphere set at 40° C. to prepare a laminate film.

While the obtained laminate film was being folded in half so as to form a fold line along the MD (machine direction) thereof, the both ends were continuously heat sealed each with a width of 20 mm at 180° C. by using a test sealer; additionally, in the direction normal to this sealing direction, heat sealing was conducted intermittently at an interval of 150 mm over a width of 10 mm to prepare a half-completed bag having a width of about 200 mm. The half-completed bag was cut in such a way that the sealed portions of both MD edges were each 10 mm in width, and then along the direction normal to this cutting direction, the half-completed bag was cut at the boundaries of the sealed portions; and thus three-side sealed bags were prepared.

In each of these bags, 100 ml of purified water was placed and was hermetically sealed with a heat sealer; the bag was subjected to a heat treatment in boiling water for 2 hours; then the contents were taken out to be a measurement sample, and the monomer concentration (ppm) and the cyclic dimer concentration (ppm) in the measurement sample were measured under the HPLC conditions of the above-described (1).

(9) Gas-Barrier Property

The gas-barrier property was evaluated by measuring the oxygen permeability.

The oxygen permeability was evaluated by measuring the oxygen gas permeability under an atmosphere of a temperature of 20° C. and a relative humidity of 65% by using an oxygen barrier tester (OX-TRAN 2/20) manufactured by Mocon, Inc.

The gas-barrier property was evaluated before and after a Gelbo treatment. The Gelbo treatment was such that 30 times of 440°-rotation-stretch movements were applied by using a Gelbo tester manufactured by Tester Sangyo Co., Ltd.

(10) Anti-Pinhole Property

The anti-pinhole property was evaluated on the basis of the Gelbo test that provided an index for the flex resistance.

Specifically, from the biaxially stretched polyamide resin film, five samples of a size of 300 mm in MD×200 mm in TD (transverse direction) were cut out. Each of the samples was exerted with 5000 times of 440°-rotation-stretch movements under an environment of 20° C. and 65% RH, by using the Gelbo tester manufactured by Tester Sangyo Co., Ltd. Thereafter, evaluation was conducted by counting the number of the pinholes generated in the sample.

(11) Adhesion Strength of a Film Having a Gas-Barrier Coat Layer

The PVDC-coated side of the biaxially stretched polyamide resin film was coated with a urethane adhesive (LX-401A/SP-60, two-part type, manufactured by Dainippon Ink and Chemicals, Inc.) so as for the coating amount to be 3.0 g/m² (dry). Through the intermediary of the coated layer, a sealant film (LLDPE, linear low density polyethylene film manufactured by Tohcello Co., Ltd., T.U.X. FCS, thickness: 50 μm) was bonded to the PVDC-coated side by dry laminating, and aging was conducted at 40° C. for 3 days to yield a laminate film.

The obtained laminate film was cut into strips of a size of 100 mm in MD×15 mm in TD under an environment of 20° C. and 65% RH, and each of the strips was peeled off by 30 mm in MD between the biaxially stretched polyamide resin film and the sealant by using a pair of tweezers, and thus laminate strength test specimens were prepared. By using a tensile tester (AS-1S, manufactured by Shimadzu Corp.) equipped with a load cell for 50 N measurement and sample chucks, the peeled ends of each of the specimens were secured. Thereafter, each of the specimens was peeled by 50 mm in MD at a tensile speed of 300 mm/min while each of the specimens was being maintained in a "T-shape" by the measurer himself/herself, and the average value of the strength at that time was gauged. Such a measurement was conducted for five specimens and the average value of the thus obtained values was taken as the adhesion strength.

In this case, when the adhesion strength between the polyamide resin layer and the gas-barrier coat layer is insufficient, only a low adhesion strength is obtained, and additionally, at the time of the measurement, the peeling interface is moved to between the polyamide resin layer and the gas-barrier coat layer. Therefore, the thus measured value was taken as the index indicating the adhesion between the polyamide resin layer and the gas-barrier coat layer. The cases where the adhesion strength was 0.8 N/cm or more were determined as passing.

(12) Examination of External Appearance after Sterilization Treatment

The film in which a polyamide resin layer was laminated with a sealant resin layer was cut to a size of 300 mm in MD×200 mm in TD, and by using an impulse sealer (manufactured by Fuji Impulse Co., Ltd.), prepared was a four-side sealed bag having an external size of 150 mm in MD×200 mm in TD and a seal width of 10 mm. The four-side sealed bag was charged with 100 ml of purified water as the contents thereof.

The four-side sealed bag as a packaging body filled with the contents thereof was subjected to a sterilization treatment by using a high-temperature high-pressure sterilization cooking apparatus (RCS-60SPXTG, manufactured by Hisaka Works, Ltd.) under the conditions that hot water spraying was adopted, the treatment temperature was 120° C., the treatment time was 30 minutes and the treatment pressure was 177 kPa (1.8 kg/cm²). Thereafter, the four-side sealed bag was allowed to stand at room temperature for 2 hours.

The external appearance of the film surface of the packaging body after having been subjected to the sterilization treatment was evaluated on the basis of the following standards.

G (good): No variation of the film surface is found between before and after the sterilization treatment.

A (average): No variation of the film surface is found visually, but rubbing of the film surface reveals white fouling.

P (poor): White fouling is found visually.

(13) Laminate Strength of a Film Having a Sealant Resin Layer

The film in which the polyamide resin layer was laminated with the sealant resin layer was cut into strips of a size of 100 mm in MD×15 mm in TD under an environment of 20° C. and 65% RH, and each of the strips was peeled off by 30 mm in MD between the biaxially stretched polyamide resin film and the sealant by using a pair of tweezers, and thus laminate strength test specimens were prepared. By using a tensile tester (AS-1S, manufactured by Shimadzu Corp.) equipped with a load cell for 50 N measurement and sample chucks, the peeled ends of each of the specimens were secured. Thereafter, each of the specimens was peeled by 50 mm in MD at a tensile speed of 300 mm/min while each of the specimens was being maintained in a "T-shape" by the measurer himself/herself, and the average value of the strength at that time was gauged. Such a measurement was conducted for five samples and the average value of the thus obtained values was taken as the laminate strength.

(14) Adhesion Strength of the Film Having an Easy-Adhesion Layer

The surface of the easy-adhesion layer of the biaxially stretched polyamide resin film was coated with a urethane adhesive (Takerack A-525/Takenate A-52, two-part type, manufactured by Mitsui Chemicals Polyurethanes, Inc.) with a coating amount of 3 g/m$^2$, and the coated film was dried with a hot air dryer set at 80° C. for 10 seconds. Then, the adhesive-coated side and the corona-treated side of a sealant film (CPP, manufactured by Tohcello Co., Ltd., unstretched polypropylene film, RXC-21, thickness: 40 μm) were bonded to each other with a nip roll. Then, the bonded film was subjected to an aging under the conditions of 40° C. and 4 days to prepare a laminate film.

The obtained laminate film was cut into strips of a size of 100 mm in MD×15 mm in TD under an environment of 20° C. and 65% RH, and each of the strips was peeled off by 30 mm in MD between the biaxially stretched polyamide resin film and the sealant by using a pair of tweezers, and by using a tensile tester (AS-1S, manufactured by Shimadzu Corp.) equipped with a load cell for 50 N measurement and sample chucks, the peeled ends of each of the strips were secured. Thereafter, each of the strips was peeled by 50 mm in MD at a tensile speed of 300 mm/min while each of the specimens was being maintained in a "T-shape" by the measurer himself/herself, and the peeling strength (T-shape water wet peeling) was measured. Such a measurement was conducted for five samples and the average value of the thus obtained values was taken as the adhesion strength.

The materials used in following Examples and Comparative Examples are as follows.

[Material a]

In a hermetically sealed reaction vessel equipped with a stirrer, 100 parts by mass of ε-caprolactam, 0.12 part by mass (10 mmol/kg in relation to ε-caprolactam) of benzoic acid and 3 parts by mass of water were placed, increased in temperature and allowed to undergo polycondensation reaction under a pressure of 0.5 MPa at a temperature of 260° C. The reaction product thus obtained was dispensed from the reaction vessel and then cut into chip shape. The chip-shaped product was refined and dried to yield the material a. In the chip-shaped material a, the terminal carboxyl group amount was found to be 46 mmol/kg, the terminal amino group amount was found to be 36 mmol/kg and the relative viscosity was found to be 3.03.

[Material b]

In a hermetically sealed reaction vessel equipped with a stirrer, 100 parts by mass of ε-caprolactam and 3 parts by mass of water were placed, increased in temperature and allowed to undergo polycondensation reaction under a pressure of 0.5 MPa at a temperature of 260° C. The reaction product thus obtained was dispensed from the reaction vessel and then cut into chip shape. The chip-shaped product was refined and dried to yield the material b. In the chip-shaped material b, the terminal carboxyl group amount was found to be 45 mmol/kg, the terminal amino group amount was found to be 46 mmol/kg and the relative viscosity was found to be 3.01.

[Material c]

In a hermetically sealed reaction vessel equipped with a stirrer, 100 parts by mass of ε-caprolactam, 0.04 part by mass (3.3 mmol/kg in relation to ε-caprolactam) of benzoic acid and 3 parts by mass of water were placed, increased in temperature and allowed to undergo polycondensation reaction under a pressure of 0.5 MPa at a temperature of 260° C. The reaction product thus obtained was dispensed from the reaction vessel and then cut into chip shape. The chip-shaped product was refined in a shorter refining time than in the case of the material a to yield the material c abundant in the cyclic dimer. In the chip-shaped material c, the terminal carboxyl group amount was found to be 47 mmol/kg, the terminal amino group amount was found to be 42 mmol/kg and the relative viscosity was found to be 3.05.

[Master Chip]

A master chip was prepared by melt-mixing 6 parts by mass of an inorganic fine particle (Syloid SY-150, manufactured by Mizusawa Industrial Chemicals, Ltd.) with 100 parts by mass of the material a.

Example 1

The material a and the master chip were blended with each other so as for the mixing ratio of the inorganic fine particle to be 0.05% by mass, placed in an extruder, melted in a cylinder heated to a temperature of 270° C., extruded from a T-die orifice in a sheet shape, and rapidly cooled by bringing the sheet into close contact with a rotating drum cooled to 10° C. to yield a 150-μm-thick unstretched film. The amount of the monomer extracted from the unstretched film was found to be 0.191% by mass, and the amount of the cyclic dimer extracted from the unstretched film was found to be 0.030% by mass.

Next, the above-described unstretched film was guided into a monomer removal bath set at a temperature of 53° C. and a pH of 7.9 as shown in Table 1, and immersed in water just for 1 minute as described in Table 1 as the monomer removal step (A). Thereafter, the unstretched film was guided into a water content regulation bath set at 60° C. and immersed in water for 20 seconds as the water content regulation step (B) to be made to absorb water to attain a water content of 6.3% by mass as shown in Table 1. Then the water-absorbed unstretched film was guided into a simultaneous biaxial stretching machine and subjected to a simultaneous biaxial stretching with a longitudinal magnification of 3.3 and a transverse magnification of 3.0. Successively, the stretched film was heat treated at a temperature of 210° C., and subjected to a relaxation treatment of 5% in the transverse direction to yield a 15-μm-thick biaxially stretched polyamide resin film. For the obtained biaxially stretched polyamide resin film, the amount of the monomer extracted therefrom and the thickness unevenness and operability thereof were evaluated, and the results thus obtained are shown in Table 1.

As shown in Table 1, only the monomer was selectively removed, and the amount of the extracted monomer was found to be extremely decreased. The amount of the extracted cyclic dimer was found to be much the same as that in the unstretched film.

Next, the obtained biaxially stretched polyamide resin film and the above-described sealant film were dry laminated with each other by using the above-described urethane adhesive to thereby prepare a laminate film. Then, the obtained laminate film was subjected to the above-described monomer migration test, and as shown in Table 1, neither the monomer nor the dimer was detected.

TABLE 1

| | Material resin | | Unstretched film | | Monomer removal step (A) | | | Water content regulation step (B) |
|---|---|---|---|---|---|---|---|---|
| | Material | Relative viscosity | Monomer amount (% by mass) | Dimer amount (% by mass) | pH | Temperature (° C.) | Time (min) | Film water content (% by mass) |
| Ex. 1 | a | 3.03 | 0.191 | 0.030 | 7.9 | 53 | 1.0 | 6.3 |
| Ex. 2 | a | 3.03 | 0.171 | 0.028 | 7.0 | 53 | 1.0 | 6.1 |
| Ex. 3 | a | 3.03 | 0.186 | 0.031 | 7.9 | 40 | 2.0 | 7.2 |
| Ex. 4 | a | 3.03 | 0.187 | 0.029 | 7.9 | 40 | 8.0 | 8.9 |
| Ex. 5 | a | 3.03 | 0.212 | 0.029 | 7.9 | 65 | 0.5 | 7.6 |
| Ex. 6 | a | 3.03 | 0.193 | 0.026 | 8.5 | 25 | 4.0 | 6.7 |
| Ex. 7 | b | 3.01 | 0.355 | 0.037 | 7.9 | 53 | 1.0 | 6.4 |
| Ex. 8 | c | 3.05 | 0.298 | 0.121 | 7.0 | 30 | 0.5 | 6.5 |
| Ex. 9 | a | 3.03 | 0.373 | 0.037 | 7.9 | 53 | 1.0 | Step not conducted |
| Ex. 10 | a | 3.03 | 0.201 | 0.026 | 7.9 | 68 | 9.0 | 6.5 |
| Com. Ex. 1 | a | 3.03 | 0.194 | 0.029 | Step not conducted | | | 6.0 |
| Com. Ex. 2 | b | 3.01 | 0.384 | 0.032 | 7.9 | 53 | 0.1 | 6.0 |
| Com. Ex. 3 | a | 3.03 | 0.205 | 0.034 | 7.9 | 80 | 1.0 | 8.2 |
| Com. Ex. 4 | a | 3.03 | 0.207 | 0.036 | 7.9 | 15 | 5.0 | 6.3 |
| Com. Ex. 5 | a | 3.03 | 0.184 | 0.032 | 6.0 | 53 | 1.0 | 6.2 |
| Com. Ex. 6 | a | 3.03 | 0.189 | 0.029 | 7.9 | 53 | 11.0 | 11.3 |

| | | Stretched film | | | | Migration test | |
|---|---|---|---|---|---|---|---|
| | Stretching method | Monomer amount (% by mass) | Dimer amount (% by mass) | Operability | Thickness unevenness | Monomer amount (ppm) | Dimer amount (ppm) |
| Ex. 1 | Simultaneous stretching | 0.003 | 0.028 | G | G | Detection limit or less | Detection limit or less |
| Ex. 2 | Simultaneous stretching | 0.003 | 0.022 | G | G | Detection limit or less | Detection limit or less |
| Ex. 3 | Simultaneous stretching | 0.006 | 0.027 | G | G | Detection limit or less | Detection limit or less |
| Ex. 4 | Simultaneous stretching | 0.003 | 0.024 | G | G | Detection limit or less | Detection limit or less |
| Ex. 5 | Simultaneous stretching | 0.005 | 0.029 | G | A | Detection limit or less | Detection limit or less |
| Ex. 6 | Simultaneous stretching | 0.038 | 0.026 | G | G | Detection limit or less | Detection limit or less |
| Ex. 7 | Simultaneous stretching | 0.004 | 0.034 | G | G | Detection limit or less | Detection limit or less |
| Ex. 8 | Simultaneous stretching | 0.078 | 0.118 | G | G | 15 | Detection limit or less |
| Ex. 9 | Successive stretching | 0.004 | 0.034 | G | G | Detection limit or less | Detection limit or less |
| Ex. 10 | Simultaneous stretching | 0.061 | 0.031 | G | G | Detection limit or less | Detection limit or less |
| Com. Ex. 1 | Simultaneous stretching | 0.107 | 0.028 | G | G | 120 | Detection limit or less |
| Com. Ex. 2 | Simultaneous stretching | 0.269 | 0.036 | G | G | 540 | Detection limit or less |
| Com. Ex. 3 | Simultaneous stretching | Plenty of winkles | | P | G | Not conducted | |
| Com. Ex. 4 | Simultaneous stretching | 0.114 | 0.029 | G | P | 110 | Detection limit or less |
| Com. Ex. 5 | Simultaneous stretching | 0.142 | 0.029 | G | G | 140 | Detection limit or less |
| Com. Ex. 6 | Simultaneous stretching | Winding appearance failure | | G | P | Not conducted | |

Example 2

The pH of the water used in the monomer removal step (A) was altered to 7.0 as described in Table 1. Otherwise in the same manner as in Example 1, a 15-μm-thick biaxially stretched polyamide resin film was obtained. The water content of the film after the water content regulation step (B) was found to be 6.1% by mass. For the obtained biaxially stretched polyamide resin film, the amount of the monomer extracted therefrom and the thickness unevenness, operability and migration test thereof were evaluated, and the results thus obtained are shown in Table 1.

Example 3

The temperature of the water used in the monomer removal step (A) and the treatment time of the monomer removal step (A) were altered to 40° C. and 2.0 minutes, respectively, as described in Table 1. Otherwise in the same manner as in Example 1, a 15-μm-thick biaxially stretched polyamide resin film was obtained. The water content of the film after the water content regulation step (B) was found to be 7.2% by mass. For the obtained biaxially stretched polyamide resin film, the amount of the monomer extracted therefrom and the thickness unevenness, operability and migration test thereof were evaluated, and the results thus obtained are shown in Table 1.

Example 4

The temperature of the water used in the monomer removal step (A) and the treatment time of the monomer removal step (A) were altered to 40° C. and 8.0 minutes, respectively, as described in Table 1. Otherwise in the same manner as in Example 1, a 15-μm-thick biaxially stretched polyamide resin film was obtained. The water content of the film after the water content regulation step (B) was found to be 8.9% by mass. For the obtained biaxially stretched polyamide resin film, the amount of the monomer extracted therefrom and the thickness unevenness, operability and migration test thereof were evaluated, and the results thus obtained are shown in Table 1.

Example 5

The temperature of the water used in the monomer removal step (A) and the treatment time of the monomer removal step (A) were altered to 65° C. and 0.5 minute, respectively, as described in Table 1. Otherwise in the same manner as in Example 1, a 15-μm-thick biaxially stretched polyamide resin film was obtained. The water content of the film after the water content regulation step (B) was found to be 7.6% by mass. For the obtained biaxially stretched polyamide resin film, the amount of the monomer extracted therefrom and the thickness unevenness, operability and migration test thereof were evaluated, and the results thus obtained are shown in Table 1.

Example 6

The pH and the temperature of the water used in the monomer removal step (A) and the treatment time of the monomer removal step (A) were altered to 8.5, 25° C. and 4.0 minutes, respectively, as described in Table 1. Otherwise in the same manner as in Example 1, a 15-μm-thick biaxially stretched polyamide resin film was obtained. The water content of the film after the water content regulation step (B) was found to be 6.7% by mass. For the obtained biaxially stretched polyamide resin film, the amount of the monomer extracted therefrom and the thickness unevenness, operability and migration test thereof were evaluated, and the results thus obtained are shown in Table 1.

Example 7

The material b was used in place of the material a. Otherwise in the same manner as in Example 1, a 15-μm-thick biaxially stretched polyamide resin film was obtained. The water content of the film after the water content regulation step (B) was found to be 6.4% by mass. For the obtained biaxially stretched polyamide resin film, the amount of the monomer extracted therefrom and the thickness unevenness, operability and migration test thereof were evaluated, and the results thus obtained are shown in Table 1.

Example 8

The material c was used in place of the material a. Additionally, the pH and the temperature of the water used in the monomer removal step (A) and the treatment time of the monomer removal step (A) were altered to 7.0, 30° C. and 0.5 minute, respectively, as described in Table 1. Otherwise in the same manner as in Example 1, a 15-μm-thick biaxially stretched polyamide resin film was obtained. The water content of the film after the water content regulation step (B) was found to be 6.5% by mass. For the obtained biaxially stretched polyamide resin film, the amount of the monomer extracted therefrom and the thickness unevenness, operability and migration test thereof were evaluated, and the results thus obtained are shown in Table 1.

In Examples 1 to 8, the monomer removal step was conducted under the predetermined conditions, and hence the amounts of the monomer in the obtained stretched films were remarkably smaller than those in the unstretched films. In the migration test of each of the obtained stretched films, the monomer was not substantially detected, or was extremely small in amount even when the monomer was detected.

Comparative Example 1

The monomer removal step (A) was omitted. Otherwise the procedure was the same as in Example 1. The water content of the film after the water content regulation step (B) was found to be 6.0% by mass. For the obtained biaxially stretched polyamide resin film, the amount of the monomer extracted therefrom and the thickness unevenness, operability and migration test thereof were evaluated, and the results thus obtained are shown in Table 1.

Even when the monomer removal step was omitted, the amount of the monomer contained in the obtained stretched film is smaller than the amount of the monomer contained in the unstretched film, and hence it was revealed that the monomer was discharged into the air either during the stretching step or during the heat treatment step. However, the amount of the monomer in the obtained stretched film remained to be larger, and the monomer was detected in a larger amount in the migration test.

Comparative Example 2

The time of the monomer removal step (A) was set at a time as short as 0.1 minute as described in Table 1. Otherwise the procedure was the same as in Example 7. The water content of the film after the water content regulation step (B) was found to be 6.0% by mass. For the obtained biaxially stretched polyamide resin film, the amount of the monomer extracted therefrom and the thickness unevenness, operability and migration test thereof were evaluated, and the results thus obtained are shown in Table 1.

The time of the monomer removal step (A) was too short, so that the amount of the monomer in the obtained stretched film was larger, and the monomer was detected in a larger amount in the migration test.

Comparative Example 3

The temperature of the water used in the monomer removal step (A) was set at a temperature as high as 80° C. as described in Table 1. Additionally, the time of the water content regulation step (B) was reduced in such a way that the water content of the film after the water content regulation step (B) was 8.2% by mass. Otherwise the procedure was the same as in Example 1. For the obtained biaxially stretched polyamide resin film, the amount of the monomer extracted therefrom and the thickness unevenness, operability and migration test thereof were evaluated, and the results thus obtained are shown in Table 1.

The temperature of the monomer removal bath was high and wrinkles occurred, and hence the stretching was conducted non-uniformly to degrade the operability.

Comparative Example 4

As shown in Table 1, the temperature of the water used in the monomer removal step (A) was set at a temperature as low as 15° C., and additionally the time of the step (A) was set at 5.0 minutes. Otherwise the procedure is the same as in Example 1. The water content of the film after the water content regulation step (B) was found to be 6.3% by mass. For the obtained biaxially stretched polyamide resin film, the amount of the monomer extracted therefrom and the thickness unevenness, operability and migration test thereof were evaluated, and the results thus obtained are shown in Table 1.

The temperature of the monomer removal bath was too low, and hence the amount of the monomer in the stretched film was a higher value. Additionally, the thickness unevenness was large and offered troubles in the lamination step.

Comparative Example 5

The pH of the water used in the monomer removal step (A) was set at a value as low as 6.0 as described in Table 1. Otherwise, the procedure was the same as in Example 1. The water content of the film after the water content regulation step (B) was found to be 6.2% by mass. For the obtained biaxially stretched polyamide resin film, the amount of the monomer extracted therefrom and the thickness unevenness, operability and migration test thereof were evaluated, and the results thus obtained are shown in Table 1.

The pH of the monomer removal bath was too low, and hence the amount of the monomer in the stretched film was a higher value.

Comparative Example 6

The time of the monomer removal step (A) was set at a value as long as 11 minutes as described in Table 1, and in the water content regulation step (B), removal of the water content was conducted by bringing the film into contact with a roll having a water-absorbing layer. Otherwise the procedure was the same as in Example 1. The water content of the film after the water content regulation step (B) was found to be 11.3% by mass. For the obtained biaxially stretched polyamide resin film, the amount of the monomer extracted therefrom and the thickness unevenness, operability and migration test thereof were evaluated, and the results thus obtained are shown in Table 1.

The water content of the film at the time of stretching was too high, and hence the thickness unevenness was serious and only a film having a poor winding appearance was obtained.

Example 9

The material a and the master chip were blended with each other so as for the mixing ratio of the inorganic fine particle to be 0.05% by mass, placed in an extruder, melted in a cylinder heated to a temperature of 260° C., melt-extruded from a T-die in a sheet shape; and rapidly cooled by bringing the sheet into close contact with a rotating drum having a surface temperature of 10° C., by using an air knife casting method to yield a 150-μm-thick unstretched film. The amount of the monomer extracted from the unstretched film was found to be 0.373% by mass, and the amount of the cyclic dimer extracted from the unstretched film was found to be 0.037% by mass.

Next, the unstretched film was longitudinally stretched at a temperature of 55° C. with a stretching magnification of 2.8 by using an MD stretching machine composed of a group of heating rollers different in circumferential speed from each other.

Next, the film was immersed in a monomer removal bath set at a temperature of 53° C. and a pH of 7.9 for 1.0 minute, and thereafter the film was transversely stretched at 90° C. with a magnification of 3.7 to perform a successive stretching treatment.

Thereafter, in the tenter, the temperature was slowly increased and a heat treatment was conducted at an ultimate maximum temperature of 210° C., and further a 2% relaxation was conducted at 210° C. in TD. Then, the film was cooled at 100° C. to yield a 15-μm-thick biaxially stretched polyamide resin film.

The amount of the monomer extracted from the obtained biaxially stretched film was found to be as small as 0.004% by mass, and the amount of the cyclic dimer extracted from the obtained biaxially stretched film was found to be 0.034% by mass.

Next, the obtained biaxially stretched polyamide resin film and the above-described sealant film were dry laminated with each other by using the above-described urethane adhesive to thereby prepare a laminate film. Then, the obtained laminate film was subjected to the above-described monomer migration test, and as shown in Table 1, neither the monomer nor the dimer was detected.

Example 10

The material a and the master chip were blended with each other so as for the mixing ratio of the inorganic fine particle to be 0.05% by mass, placed in an extruder, melted in a cylinder heated to a temperature of 270° C., extruded from a T-die orifice in a sheet shape, and rapidly cooled by bringing the sheet into close contact with a rotating drum cooled to 10° C. to yield a 150-μm-thick unstretched film. The amount of the monomer extracted from the unstretched film was found to be 0.201% by mass, and the amount of the cyclic dimer extracted from the unstretched film was found to be 0.026% by mass.

Next, the unstretched film was guided into a water content regulation bath set at 40° C. and first immersed in water for 20 seconds as the water content regulation step (B) to be made to absorb water to attain the predetermined water content shown in Table 1. Next, the water-absorbed unstretched film was guided into a simultaneous biaxial stretching machine and subjected to a simultaneous biaxial stretching with a longitudinal magnification of 3.3 and a transverse magnification of 3.0. Successively, the stretched film was heat treated at a temperature of 210° C., and subjected to a relaxation treatment of 5% in the transverse direction to yield a 15-μm-thick biaxially stretched polyamide resin film. Next, the obtained biaxially stretched polyamide resin film was guided into a monomer removal bath set at 68° C. and a pH of 7.9 as shown in Table 1, and was immersed in water just for 9.0 minutes as the monomer removal step (A). Thereafter, while the stretched film was being dried by blowing hot air at 90° C., the stretched film was wound up. For the obtained biaxially stretched polyamide resin film, the amount of the monomer extracted therefrom and the thickness unevenness, operability and migration test thereof were evaluated, and the results thus obtained are shown in Table 1.

As shown in Table 1, the amount of the monomer in the obtained biaxially stretched polyamide resin film was remarkably smaller than that in the unstretched film, and additionally, in the migration test of the obtained biaxially stretched polyamide resin film, the monomer was not substantially detected.

Examples 11 to 20

The biaxially stretched polyamide resin films of Examples 1 to 10 were vapor-deposited with aluminum so as for the deposition thickness to be 30 nm by using an electron beam heating vacuum vapor-deposition apparatus. The gas-barrier performances of the thus vapor-deposited films were measured. Further, the vapor-deposited films were subjected to the Gelbo treatment and the gas-barrier performances of the thus treated vapor-deposited films were measured. The results thus obtained are shown in Table 2.

TABLE 2

| | | Gas-barrier property (vapor-deposited film) | |
|---|---|---|---|
| | Film before vapor-deposition | Before Gelbo treatment (ml/(m²·d·MPa)) | After Gelbo treatment (ml/(m²·d·MPa)) |
| Ex. 11 | Film of Example 1 | 25.6 | 50.2 |
| Ex. 12 | Film of Example 2 | 30.6 | 45.9 |
| Ex. 13 | Film of Example 3 | 33.5 | 70.6 |
| Ex. 14 | Film of Example 4 | 20.6 | 40.5 |
| Ex. 15 | Film of Example 5 | 31.7 | 51.3 |
| Ex. 16 | Film of Example 6 | 20.8 | 40.8 |
| Ex. 17 | Film of Example 7 | 18.9 | 35.5 |
| Ex. 18 | Film of Example 8 | 23.5 | 65.1 |
| Ex. 19 | Film of Example 9 | 28.3 | 34.7 |
| Ex. 20 | Film of Example 10 | 19.9 | 97.6 |
| Com. Ex. 7 | Film of Comparative Example 1 | 35.5 | 110.6 |
| Com. Ex. 8 | Film of Comparative Example 2 | 40.8 | 210.4 |
| Com. Ex. 9 | Film of Comparative Example 4 | 31.8 | 98.6 |
| Com. Ex. 10 | Film of Comparative Example 5 | 39.4 | 133.4 |

Comparative Examples 7 to 10

The biaxially stretched polyamide resin films of Comparative Examples 1, 2, 4 and 5 were vapor-deposited with aluminum so as for the deposition thickness to be 30 nm by using an electron beam heating vacuum vapor-deposition apparatus to yield the biaxially stretched polyamide resin films of Comparative Examples 7, 8, 9 and 10, respectively. The gas barrier performances of the thus obtained vapor-deposited films were measured. Further, the vapor-deposited films were subjected to the Gelbo treatment and the gas-barrier performances of the thus treated vapor-deposited films were measured. The results thus obtained are shown in Table 2.

As shown in Table 2, Examples 11 to 20 were found to be higher in gas-barrier performance than Comparative Examples 7 to 10. This tendency was particularly remarkable after the Gelbo treatment. The fact that the gas-barrier property was worse in Comparative Examples 7 to 10, which were larger in the extracted monomer amount, than in Examples 11 to 20, which were smaller in the extracted monomer amount, is inferred to be ascribable to the formation of the following vapor-deposition-free defects: in the case where the amount of the monomer deposited on the film surface is larger, when the vapor-deposition treatment is applied onto such deposited monomer and the deposited monomer is exfoliated by the Gelbo treatment, the vapor-deposited matter is also exfoliated together with the deposited monomer, and thus vapor-deposition-free defects are formed.

Example 21

The material a and the master chip were blended with each other so as for the mixing ratio of the inorganic fine particle to be 0.05% by mass, placed in an extruder, melted in a cylinder heated to a temperature of 270° C., extruded from a T-die orifice in a sheet shape, and rapidly cooled by bringing the sheet into close contact with a rotating drum cooled to 10° C. to yield a 150-μm-thick unstretched film. The amount of the monomer extracted from the unstretched film was found to be 0.189% by mass.

Next, the above-described unstretched film was guided into a monomer removal bath set at 53° C. and a pH of 7.9 as shown in Table 3, and was immersed in water just for 1.0 minute as the monomer removal step (A). Thereafter, the unstretched film was guided into a water content regulation bath set at 60° C. and made to absorb water to attain a water content of 6.3% by mass as shown in Table 3 as the water content regulation step (B). Next, one side of the water-absorbed unstretched film was coated with a PVDC latex (L561B (solid content concentration: 50% by mass), manufactured by Asahi Kasei Chemicals Corp.) so as for the thickness of the gas-barrier coat layer after stretching to be 2.0 μm. Thereafter, the coated unstretched film was guided into a simultaneous biaxial stretching machine and subjected to a simultaneous biaxial stretching with an MD magnification of 3.3 and a TD magnification of 3.0. Successively, the stretched film was heat treated at a temperature of 210° C., and subjected to a relaxation treatment of 5% in TD to yield a 15-μm-thick biaxially stretched polyamide resin film having gas-barrier property.

For the obtained biaxially stretched polyamide resin film, the gas-barrier property, anti-pinhole property and adhesion strength thereof were evaluated. The results thus obtained are shown in Table 3.

TABLE 3

| | Monomer amount in unstretched film (% by mass) | Monomer removal step (A) | | | Water content regulation step (B) | |
|---|---|---|---|---|---|---|
| | | pH | Temperature (°C.) | Time (min) | Water content in film (% by mass) | Coating agent |
| Ex. 21 | 0.189 | 7.9 | 53 | 1.0 | 6.3 | L561B |
| Ex. 22 | 0.189 | 7.9 | 53 | 1.0 | 6.3 | L561B |
| Ex. 23 | 0.189 | 7.9 | 53 | 1.0 | 6.3 | L561B |
| Ex. 24 | 0.337 | 7.9 | 68 | 9.0 | 6.5 | L536B |
| Ex. 25 | 0.193 | 8.5 | 25 | 4.0 | 6.7 | L536B |
| Ex. 26 | 0.373 | 7.9 | 53 | 1.0 | Step not conducted | L529B |
| Ex. 27 | 0.189 | 7.9 | 53 | 1.0 | 6.3 | L561B |

TABLE 3-continued

| | | | | | | | Performances of stretched film | | |
|---|---|---|---|---|---|---|---|---|---|
| Ex. 28 | 0.189 | 7.9 | 53 | 1.0 | | 6.3 | L561B | | |
| Com. Ex. 11 | 0.194 | | Step not conducted | | | 6.0 | L561B | | |
| Com. Ex. 12 | 0.184 | 6.0 | 53 | 11.0 | | 6.2 | L561B | | |

| | Stretching method | Monomer amount in stretched film (% by mass) | Coat layer thickness (μm) | Gas-barrier property (ml/(m$^2$·d·MPa)) | Anti-pinhole property (number of pinholes) | Adhesion strength (N/cm) |
|---|---|---|---|---|---|---|
| Ex. 21 | Simultaneous stretching | 0.002 | 2.0 | 68 | 1~3 | 3.46 |
| Ex. 22 | Simultaneous stretching | 0.002 | 0.7 | 128 | 0~1 | 3.06 |
| Ex. 23 | Simultaneous stretching | 0.002 | 3.3 | 52 | 3~5 | 3.14 |
| Ex. 24 | Simultaneous stretching | 0.085 | 1.5 | 80 | 0~2 | 1.75 |
| Ex. 25 | Simultaneous stretching | 0.038 | 1.5 | 72 | 0~2 | 1.98 |
| Ex. 26 | Successive stretching | 0.004 | 1.6 | 86 | 0~2 | 2.74 |
| Ex. 27 | Simultaneous stretching | 0.002 | 0.3 | 202 | 0~1 | 3.23 |
| Ex. 28 | Simultaneous stretching | 0.002 | 4.0 | 35 | 7~9 | 3.08 |
| Com. Ex. 11 | Simultaneous stretching | 0.107 | 1.5 | 73 | 0~2 | 0.75 |
| Com. Ex. 12 | Simultaneous stretching | 0.142 | 2.2 | 66 | 2~3 | 0.48 |

Examples 22 and 23

In each of Examples 22 and 23, the thickness of the gas-barrier coat layer was altered to the value described in Table 3. Otherwise in the same manner as in Example 21, 15-μm-thick biaxially stretched polyamide resin films were obtained. The evaluation results for the obtained biaxially stretched polyamide resin films are shown in Table 3.

Examples 24 and 25

In each of Examples 24 and 25, the conditions of the monomer removal step (A) and the water content of film were altered as described in Table 3, and additionally, the coating agent was altered to a PVDC latex (L536B (solid content concentration: 50% by mass), manufactured by Asahi Kasei Chemicals Corp.) and the thickness of the gas-barrier coat layer was altered as described in Table 3. Otherwise in the same manner as in Example 21, 15-μm-thick biaxially stretched polyamide resin films were obtained. The evaluation results for the obtained biaxially stretched polyamide resin films are shown in Table 3.

Example 26

The material a and the master chip were blended with each other so as for the mixing ratio of the inorganic fine particle to be 0.05% by mass, placed in an extruder, melted in a cylinder heated to a temperature of 260° C., melt-extruded from a T-die in a sheet shape, and rapidly cooled by bringing the sheet into close contact with a rotating drum having a surface temperature of 10° C. to yield a 150-μm-thick unstretched film. The amount of the monomer extracted from the unstretched film was found to be 0.373% by mass.

Next, the unstretched film was longitudinally stretched at a temperature of 55° C. with a stretching magnification of 2.8 by using an MD stretching machine composed of a group of heating rollers different in circumferential speed from each other. Thereafter, the stretched film was guided into the monomer removal step (A) subjected to the conditions shown in Table 3, and successively coated with a PVDC latex (L529B (solid content concentration: 50% by mass), manufactured by Asahi Kasei Chemicals Corp.) so as for the thickness of the gas-barrier coat layer after stretching to be 1.6 μm. Thereafter, the coated longitudinally stretched film was transversely stretched at 90° C. with a magnification of 3.7 by using a tenter to perform a successive stretching treatment.

Thereafter, in the tenter, the temperature was slowly increased and a heat treatment was conducted at an ultimate maximum temperature of 210° C., and further a 2% relaxation was conducted at 210° C. in TD to yield a 15-μm-thick biaxially stretched polyamide resin film. The evaluation results of the obtained biaxially stretched polyamide resin film are shown in Table 3.

Example 27

The thickness of the gas-barrier coat layer was altered to 0.3 μm. Otherwise the procedure was the same as in Example 21. The evaluation results of the obtained biaxially stretched polyamide resin film are shown in Table 3.

Example 28

The thickness of the coat was altered to 4.0 μm. Otherwise the procedure was the same as in Example 21. The evaluation results of the obtained biaxially stretched polyamide resin film are shown in Table 3.

In any of Examples 21 to 28, the monomer amount of the stretched film was 0.1% by mass or less, and hence the adhesion strength between the polyamide resin layer and the gas-barrier coat layer was satisfactory. The thicker the gas-barrier coat layer was, the better the gas-barrier property was, and on the other hand, the more the anti-pinhole property of the film was degraded; however, all of the biaxially stretched polyamide resin films of Examples 21 to 28 were found to meet a passing level.

Comparative Example 11

The monomer removal step (A) was omitted. Additionally, the water content of the film after the water content regulation step (B) was set at 6.0% by mass, and the thickness of the gas-barrier coat layer was set at 1.5 μm. Otherwise the procedure was the same as in Example 21. The evaluation results of the obtained biaxially stretched polyamide resin film are shown in Table 3.

Although the monomer removal step was omitted, the amount of the monomer in the obtained stretched film was smaller than the amount of the monomer in the unstretched film; and hence it was revealed that the monomer was discharged into the air either during the stretching step or during the heat treatment step. However, the amount of the monomer in the obtained stretched film remained to be larger and the adhesion between the polyamide resin layer and the gas-barrier coat layer was not sufficient.

Comparative Example 12

As shown in Table 3, the conditions of the monomer removal step (A) were set such that the pH was 6.0 and the time was 11.0 minutes. The water content of the film was set at 6.2% by mass. The thickness of the gas-barrier coat layer was set at 2.2 μm. Otherwise the procedure was the same as in Example 21. The evaluation results of the obtained biaxially stretched polyamide resin film are shown in Table 3.

The pH of the monomer removal bath was too low, and hence the amount of the monomer in the stretched film was larger and the adhesion between the polyamide resin layer and the barrier coat layer was not sufficient.

Examples 29 to 31

The biaxially stretched polyamide resin laminate films of Examples 29 to 31 were obtained from the biaxially stretched polyamide resin films of Examples 1 to 3, respectively, as follows. One side of each of the biaxially stretched polyamide resin films of Examples 1 to 3 was subjected to a corona discharge treatment, and the corona-treated side was coated with an adhesive (Takerack A-525/Takenate A-52, two-part type, manufactured by Mitsui Chemicals Polyurethanes, Inc.), the coated film was dried with a hot air dryer set at 80° C. for 10 seconds, and thus the adhesive coating amount was set to be 3.5 g/m². The adhesive-coated side and the corona-treated side of a sealant film (CPP film, manufactured by Tohcello Co., Ltd., unstretched polypropylene film, RXC-21, thickness: 50 μm) were bonded to each other with a nip roll (nip condition: 80° C.), and the bonded film was subjected to an aging in an atmosphere set at 40° C. for 72 hours to prepare a laminate film, namely, each of the biaxially stretched polyamide resin laminate films of Examples 29 to 31.

For each of the obtained biaxially stretched polyamide resin laminate films, the external appearance after the sterilization treatment and laminate strength thereof were evaluated, and the results thus obtained are shown in Table 4.

TABLE 4

| | | Laminate film | | |
|---|---|---|---|---|
| | | | Laminate strength (N/cm) | |
| | Film before vapor-deposition | Evaluation of external appearance after sterilization treatment | Untreated | After sterilization treatment |
| Ex. 29 | Film of Example 1 | G | 5.0 | 4.6 |
| Ex. 30 | Film of Example 2 | G | 5.0 | 4.7 |
| Ex. 31 | Film of Example 3 | G | 5.2 | 4.9 |
| Ex. 32 | Film of Example 6 | G | 5.1 | 4.7 |
| Ex. 33 | Film of Example 7 | G | 5.6 | 5.0 |
| Ex. 34 | Film of Example 8 | A | 5.3 | 4.8 |
| Com. Ex. 13 | Film of Comparative Example 1 | P | 3.3 | 1.0 |
| Com. Ex. 14 | Film of Comparative Example 2 | P | 4.0 | 2.0 |
| Com. Ex. 15 | Film of Comparative Example 4 | Not conducted | | |
| Com. Ex. 16 | Film of Comparative Example 5 | P | 3.5 | 2.5 |

Examples 32 to 34

The biaxially stretched polyamide resin laminate films of Examples 32 to 34 were obtained by applying the same treatment as in Examples 29 to 31 to the biaxially stretched polyamide resin films of Examples 6 to 8, respectively.

For each of the obtained biaxially stretched polyamide resin laminate films, the external appearance after the sterilization treatment and laminate strength thereof were evaluated, and the results thus obtained are shown in Table 4.

In each of Examples 29 to 34, the amount of the monomer extracted from the obtained biaxially stretched polyamide resin laminate film was smaller, the external appearance failure in the laminate film with the sealant resin layer after the sterilization treatment was not found and the laminate strength was sufficient.

Comparative Examples 13 to 16

The biaxially stretched polyamide resin laminate films of Comparative Examples 13, 14, 15 and 16 were obtained by applying the same treatment as in Examples 29 to the biaxially stretched polyamide resin films of Comparative Examples 1, 2, 4 and 5, respectively.

For each of the obtained biaxially stretched polyamide resin laminate films, the external appearance after the sterilization treatment and laminate strength thereof were evaluated, and the results thus obtained are shown in Table 4.

In Comparative Example 13, the monomer removal step was omitted, and hence the obtained biaxially stretched polyamide resin laminate film remained to be larger in the monomer amount, and was found to undergo external appearance failure after the sterilization treatment.

In Comparative Example 14, the time of the monomer removal step (A) was too short, and hence the obtained biaxially stretched polyamide resin laminate film was larger in the monomer amount, and was found to undergo external appearance failure after the sterilization treatment.

In Comparative Example 15, the temperature of the monomer removal bath was too low, and hence the amount of the monomer in the film forming the polyamide resin layer was larger, and additionally the thickness unevenness was also large. Consequently, troubles occurred in the laminate step and no film laminated with a sealant layer was able to be obtained.

In Comparative Example 16, the pH of the monomer removal bath was too low, and hence the obtained biaxially stretched polyamide resin laminate film was larger in the monomer amount and was found to undergo external appearance failure after the sterilization treatment.

Examples 35 to 40

A mixture was prepared by mixing together 100 parts by mass of a urethane emulsion "KU-400SF" manufactured by Dainippon Ink and Chemicals, Inc. and 6 parts by mass of a melamine resin "Beckamine APN" manufactured by Dainippon Ink and Chemicals, Inc., and the mixture was diluted with water to prepare an easy-adhesion coat liquid with the concentration adjusted to 10% by mass. The easy-adhesion coat liquid was applied to one side of each of the water-absorbed unstretched films submitted to the monomer removal step (A) in the same manner as in Examples 1 to 6, and dried. Thereafter, each of the films was guided into a simultaneous biaxial stretching machine and subjected to a simultaneous biaxial stretching with a magnification of 3.3 in MD and a magnification of 3.0 in TD. Successively, the stretched film was heat treated at a temperature of 210° C., and subjected to a relaxation treatment of 5% in TD to yield a 15-μm-thick biaxially stretched polyamide resin film in which the polyamide resin layer and an easy-adhesion layer were laminated with each other. For each of the obtained biaxially stretched polyamide resin films, the amount of the monomer extracted therefrom and the thickness unevenness and operability thereof were evaluated, and the results thus obtained are shown in Table 5.

TABLE 5

| | Material resin | | Unstretched film | | Monomer removal step (A) | | | Water content regulation step (B) |
|---|---|---|---|---|---|---|---|---|
| | Material | Relative viscosity | Monomer amount (% by mass) | Dimer amount (% by mass) | pH | Temperature (° C.) | Time (min) | Film water content (% by mass) |
| Ex. 35 | a | 3.03 | 0.191 | 0.030 | 7.9 | 53 | 1.0 | 6.3 |
| Ex. 36 | a | 3.03 | 0.171 | 0.028 | 7.0 | 53 | 1.0 | 6.1 |
| Ex. 37 | a | 3.03 | 0.186 | 0.031 | 7.9 | 40 | 2.0 | 7.2 |
| Ex. 38 | a | 3.03 | 0.187 | 0.029 | 7.9 | 40 | 8.0 | 8.9 |
| Ex. 39 | a | 3.03 | 0.212 | 0.029 | 7.9 | 65 | 0.5 | 7.6 |
| Ex. 40 | a | 3.03 | 0.193 | 0.026 | 8.5 | 25 | 4.0 | 6.7 |
| Ex. 41 | a | 3.03 | 0.192 | 0.031 | 7.9 | 53 | 1.0 | 6.4 |
| Ex. 42 | a | 3.03 | 0.192 | 0.031 | 7.9 | 53 | 1.0 | 6.2 |
| Com. Ex. 17 | a | 3.03 | 0.194 | 0.029 | | Step not conducted | | 6.0 |
| Com. Ex. 18 | b | 3.01 | 0.384 | 0.032 | 7.9 | 53 | 0.1 | 6.0 |
| Com. Ex. 19 | a | 3.03 | 0.205 | 0.034 | 7.9 | 80 | 1.0 | 6.2 |
| Com. Ex. 20 | a | 3.03 | 0.207 | 0.036 | 7.9 | 15 | 5.0 | 6.3 |
| Com. Ex. 21 | a | 3.03 | 0.184 | 0.032 | 6.0 | 53 | 11 | 6.2 |
| Com. Ex. 22 | a | 3.03 | 0.189 | 0.029 | 7.9 | 53 | 1.0 | 11.3 |
| Com. Ex. 23 | a | 3.03 | 0.190 | 0.030 | 7.9 | 53 | 1 | 6.4 |

| | Easy-adhesion layer | Stretching method | Operability | Thickness unevenness | Stretched film | | Adhesion strength (N/cm) |
|---|---|---|---|---|---|---|---|
| | | | | | Monomer amount (% by mass) | Dimer amount (% by mass) | |
| Ex. 35 | Present | Simultaneous stretching | G | G | 0.003 | 0.028 | 1.8 |
| Ex. 36 | Present | Simultaneous stretching | G | G | 0.003 | 0.022 | 1.9 |
| Ex. 37 | Present | Simultaneous stretching | G | G | 0.006 | 0.027 | 1.9 |
| Ex. 38 | Present | Simultaneous stretching | G | G | 0.003 | 0.024 | 1.7 |
| Ex. 39 | Present | Simultaneous stretching | G | A | 0.005 | 0.029 | 1.8 |
| Ex. 40 | Present | Simultaneous stretching | G | G | 0.038 | 0.026 | 2.0 |
| Ex. 41 | Present | Simultaneous stretching | G | G | 0.004 | 0.036 | 1.8 |

TABLE 5-continued

| | | | | | | | |
|---|---|---|---|---|---|---|---|
| Ex. 42 | Present | Simultaneous stretching | G | G | 0.004 | 0.032 | 1.6 |
| Com. Ex. 17 | Present | Simultaneous stretching | G | G | 0.107 | 0.028 | 1.7 |
| Com. Ex. 18 | Present | Simultaneous stretching | G | G | 0.269 | 0.036 | 1.8 |
| Com. Ex. 19 | Present | Simultaneous stretching | P | G | Plenty of wrinkles | | Impracticable |
| Com. Ex. 20 | Present | Simultaneous stretching | G | P | 0.114 | 0.029 | 1.9 |
| Com. Ex. 21 | Present | Simultaneous stretching | G | G | 0.142 | 0.029 | 1.9 |
| Com. Ex. 22 | Present | Simultaneous stretching | G | P | Winding appearance failure | | Impracticable |
| Com. Ex. 23 | Absent | Simultaneous stretching | G | G | 0.003 | 0.029 | 0.3 |

As shown in Table 5, only the monomer was selectively removed, and the amount of the extracted monomer was found to be extremely decreased. The amount of the extracted cyclic dimer was found to be much the same as that in the unstretched film.

Example 41

The easy-adhesion coat liquid was altered to an easy-adhesion coat liquid prepared by mixing together a urethane emulsion "Neo Rez R600" manufactured by DSM Co., Ltd. and a melamine resin "Sumimal M-30W" manufactured by Sumitomo Chemical Co., Ltd. Otherwise in the same manner as in Example 35, a biaxially stretched polyamide resin film was obtained. For the obtained biaxially stretched polyamide resin film, the amount of the monomer extracted therefrom and the thickness unevenness, operability and adhesiveness thereof were evaluated, and the results thus obtained are shown in Table 5.

Example 42

The easy-adhesion coat liquid was altered to an easy-adhesion coat liquid prepared by mixing together a urethane-urea emulsion "WPB60-1" manufactured by Takeda Pharmaceutical Co., Ltd. and a melamine resin "Sumimal M-30W" manufactured by Sumitomo Chemical Co., Ltd. Otherwise in the same manner as in Example 35, a biaxially stretched polyamide resin film was obtained. For the obtained biaxially stretched polyamide resin film, the amount of the monomer extracted therefrom and the thickness unevenness, operability and adhesiveness thereof were evaluated, and the results thus obtained are shown in Table 5.

Each of the biaxially stretched polyamide resin films obtained in Examples 35 to 42 was coated with an ink, and dry laminated with the sealant film shown in the above-described (14) by using the urethane adhesive shown in the above-described (14). Thereafter, interlayer peeling was attempted at the polyamide resin film/sealant film interface, but the sealant film was elongated and it was difficult to expose the interface.

Comparative Examples 17 to 22

In each of Comparative Examples 17 to 22, the conditions of the monomer removal step (A) were set as described in Table 5, and otherwise the procedure was the same as in Example 41. For each of the obtained biaxially stretched polyamide resin films, the amount of the monomer extracted therefrom and the thickness unevenness, operability and adhesiveness thereof were evaluated, and the results thus obtained are shown in Table 5.

In any of these Comparative Examples 17 to 22, the detected amount of the monomer extracted from the obtained stretched film was larger.

Comparative Example 23

The step of applying the easy-adhesion coat liquid was omitted. Otherwise in the same manner as in Example 35, a biaxially stretched polyamide resin film was obtained. For the obtained biaxially stretched polyamide resin film, the amount of the monomer extracted therefrom and the thickness unevenness, operability and adhesiveness thereof were evaluated, and the results thus obtained are shown in Table 5. Although the amount of the monomer in the obtained film was smaller, the adhesiveness was weak and peeling easily occurred between the film and the ink.

The invention claimed is:

1. A method for producing a biaxially stretched polyamide resin film which is a biaxially stretched film having a polyamide resin layer, wherein an amount of a caprolactam monomer extracted from the film in distilled water at 100° C. for 2 hours is 0.1% by mass or less with respect to the mass of film, and the polyamide resin comprises a polyamide resin in which caproamide is a repeating unit thereof, comprising implementation, at a stage in a production process of the biaxially stretched film using the polyamide resin, of a monomer removal step in which the film is brought into contact with water set at a pH of 7.5 to 9.0 and a temperature of 53 to 70° C. for 0.5 to 10 minutes.

2. The method for producing a biaxially stretched polyamide resin film according to claim 1, wherein an unstretched polyamide film is treated in the monomer removal step, thereafter a water content of the film is regulated to be 2 to 10% by mass in a water content regulation step, and then the film is simultaneously biaxially stretched.

* * * * *